Patented Apr. 21, 1936

2,037,909

UNITED STATES PATENT OFFICE 2,037,909

MONOAZO DYE AND ITS PRODUCTION

Arthur Howard Knight, Blackley, Manchester, England, assignor to Imperial Chemical Industries Limited, a corporation of Great Britain No Drawing. Application June 2, 1933, Serial No. 674,122. In Great Britain June 9, 1932

2 Claims. (Cl. 260—97)

According to the present invention new azo dyestuffs are obtained by combining the diazo compound of 5-nitro-2-anisidine with 1,3,5-xylenol.

The dyestuff so obtained dyes cellulose esters and cellulose ethers in yellowish orange shades. The dyestuff is sparingly soluble or insoluble in water and is applied in the form of an aqueous suspension. The dyeings so obtained possess excellent fastness properties.

The invention is illustrated but not limited by the following example in which the parts are by weight.

The solution obtained by diazotizing 168 parts of 5-nitro-2-anisidine in the usual way is added slowly to a solution prepared by dissolving 122 parts of 1,3,5-xylenol in a solution of 4,800 parts of water and 40 parts of caustic soda, adding 208 parts of sodium carbonate and adjusting the temperature to 5°–10° C. When combination is complete the dyestuff which is out of solution is filtered off, washed with water, and preserved as paste. It dyes cellulose acetate in yellowish orange shades of very good fastness to light and washing when applied, for example, as follows:—

Enough of the dyestuff paste to contain one lb. of dyestuff is added to a lukewarm dyebath, and to this dyebath 100 lbs. of cellulose acetate yarn are then added. The temperature is raised to 80° C. during half an hour and the material is dyed for a further half an hour at this temperature. It is then washed and dried in the usual manner giving a yellowish orange dyeing.

I claim:

1. A process for producing an azo dye which comprises coupling diazotized 5-nitro-2-anisidine with 1,3,5-xylenol.

2. An azo dye having the following formula:

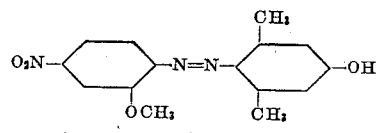

ARTHUR HOWARD KNIGHT.